United States Patent
Fillmore et al.

[11] Patent Number: 5,176,291
[45] Date of Patent: Jan. 5, 1993

[54] DISPENSING PACKAGE FOR A VISCOUS PRODUCT WITH A REUSABLE PUMPING MECHANISM

[75] Inventors: William F. Fillmore, Toledo; Raj Krishna, Sylvania; Kurt N. Harris, Haskins, all of Ohio

[73] Assignee: Owens-Illinois Closure Inc., Toledo, Ohio

[21] Appl. No.: 715,187

[22] Filed: Jun. 14, 1991

[51] Int. Cl.⁵ .................. B65D 83/00; B67D 5/42
[52] U.S. Cl. ................................ 222/1; 222/145; 222/325; 222/380
[58] Field of Search .......... 222/94, 135, 136, 145, 222/256-260, 321, 325-327, 340, 341, 207, 209, 212, 213, 372, 380, 383, 386, 387, 391, 1

[56] References Cited

U.S. PATENT DOCUMENTS

| | | | |
|---|---|---|---|
| 4,511,068 | 4/1985 | Bossina | 222/257 |
| 4,796,786 | 1/1989 | Czech | 222/256 |
| 4,821,926 | 4/1989 | Battegazzore | 222/380 X |
| 4,830,228 | 5/1989 | Fillmore | 222/260 X |
| 4,907,726 | 3/1990 | Harris | 222/145 |
| 5,042,694 | 8/1991 | Birmelin | 222/207 X |
| 5,104,009 | 4/1992 | Battegazzore | 222/380 X |

FOREIGN PATENT DOCUMENTS 0376097 7/1990 European Pat. Off. .

Primary Examiner—Kevin P. Shaver

[57] ABSTRACT

A dispensing package (14, 114, 214) which is made up of a reusable pumping head portion (16, 116, 216) and a body portion (18, 118, 218) to which the head portion is removably attached. The pumping action is initiated by the reciprocation of an annular, reciprocable dosing piston (30, 130, 230) which may be a part of the body portion (30, 130) or a part of the head portion (230). The reciprocation of the dosing piston is initiated by the arcuate movement of a pumping lever (40) that is carried by the head portion. The pumping lever is biased by a spring (46) to return to its original position at the conclusion of a pumping cycle. Striping can be accomplished by providing the dosing piston with a spout (32, 232') that extends downwardly therefrom, the spout having a circumferential series of spaced apart apertures (32d, 232d') extending therethrough above a lower bottom tip portion (32b, 232b') thereof.

16 Claims, 6 Drawing Sheets

DISPENSING PACKAGE FOR A VISCOUS PRODUCT WITH A REUSABLE PUMPING MECHANISM

BACKGROUND OF THE INVENTION

1. Field Of The Invention

This invention relates to a hand operable dispensing package for a viscous product such as a gel, a cream, or a paste such as toothpaste. More particularly, this invention relates to a dispensing package of the foregoing character in which a pumping mechanism component thereof can be reused by attaching it to a refill product containing cartridge, after a prior cartridge has been emptied of the viscous product that was initially contained therein. Dispensing packages according to this invention can be provided both in striping and non-striping embodiments.

2. Description Of The Prior Art

U.S. Pat. No. 4,907,726 (K. N. Harris) discloses a dispensing package for a viscous product, such as toothpaste. The package has a pumping mechanism and dispensing opening at one end of an annular body, and the product that is initially supplied with the package is gradually advanced from a mass within the body through the dispensing opening by the action of the pumping mechanism. The package also has a follower piston which is initially positioned at the opposed end of the annular body and which gradually moves through the annular body as product is dispensed therefrom to maintain a supply of product in communication with the dispensing opening, notwithstanding that other product from within the annular body has previously been dispensed through the dispensing opening. A drawback to a package of this type is that the entire package must be discarded after all or substantially all of the viscous product that was initially supplied therewith has been dispensed; there is no practical way to refill the dispensing package with fresh viscous product, or even to reuse the pumping mechanism thereof by reattaching it to a fresh, viscous product containing refill cartridge. The economic and environmental advantages of a viscous product dispensing package in which at least a substantial portion of the original package is reusable, relative to a non-refillable and non-reusable package such as that of the aforesaid U.S. Pat. No. 4,907,726, are self-evident; nevertheless, prior to the making of this invention no one has been able to provide a viscous product dispensing package of suitable design in which any substantial portion can be reused.

SUMMARY OF THE INVENTION

According to the present invention there is provided a dispensing package for a viscous product in which a pumping mechanism is removably affixed to an end of a viscous product containing cartridge. The pumping mechanism can be removed from the cartridge after substantially all of the product that was originally contained therein has been dispensed therefrom; thereupon the pumping mechanism can be reused by removably attaching it to a fresh, product containing refill cartridge, and the process can be continued throughout the useful life of the pumping mechanism. A package according to the present invention utilizes a pumping or dosing piston near the hand-operable pumping mechanism to ensure that doses of suitable mass are available, in succession, for flow through the dispensing outlet, and alternative embodiments of the invention are disclosed in which the pumping or dosing piston is (i) a part of the structure of the reusable pumping mechanism, and (ii) a part of the structure of the non-reusable viscous product containing cartridge. Each of these embodiments can be provided both in striping and non-striping versions.

Accordingly, it is an object of the present invention to provide an improved viscous product dispensing package. More particularly, it is an object of the present invention to provide a viscous product dispensing package in which a substantial portion of the package can be reused after the product that was originally contained in the package has been dispensed therefrom. It is also an object of the present invention to provide a viscous product dispensing package in which a substantial portion of the package can be reused and which can be manufactured both in striping and non-striping versions.

For a further understanding of the present invention and the objects thereof, attention is directed to the drawing and the following brief description thereof, to the detailed description of the preferred embodiment, and to the appended claims.

BRIEF DESCRIPTION OF THE DRAWING

FIG. 11 is a view similar to FIG. 8 of a replacement cartridge for the package of FIG. 10.

DETAILED DESCRIPTION OF THE PREFERRED EMBODIMENT

Figure 1:
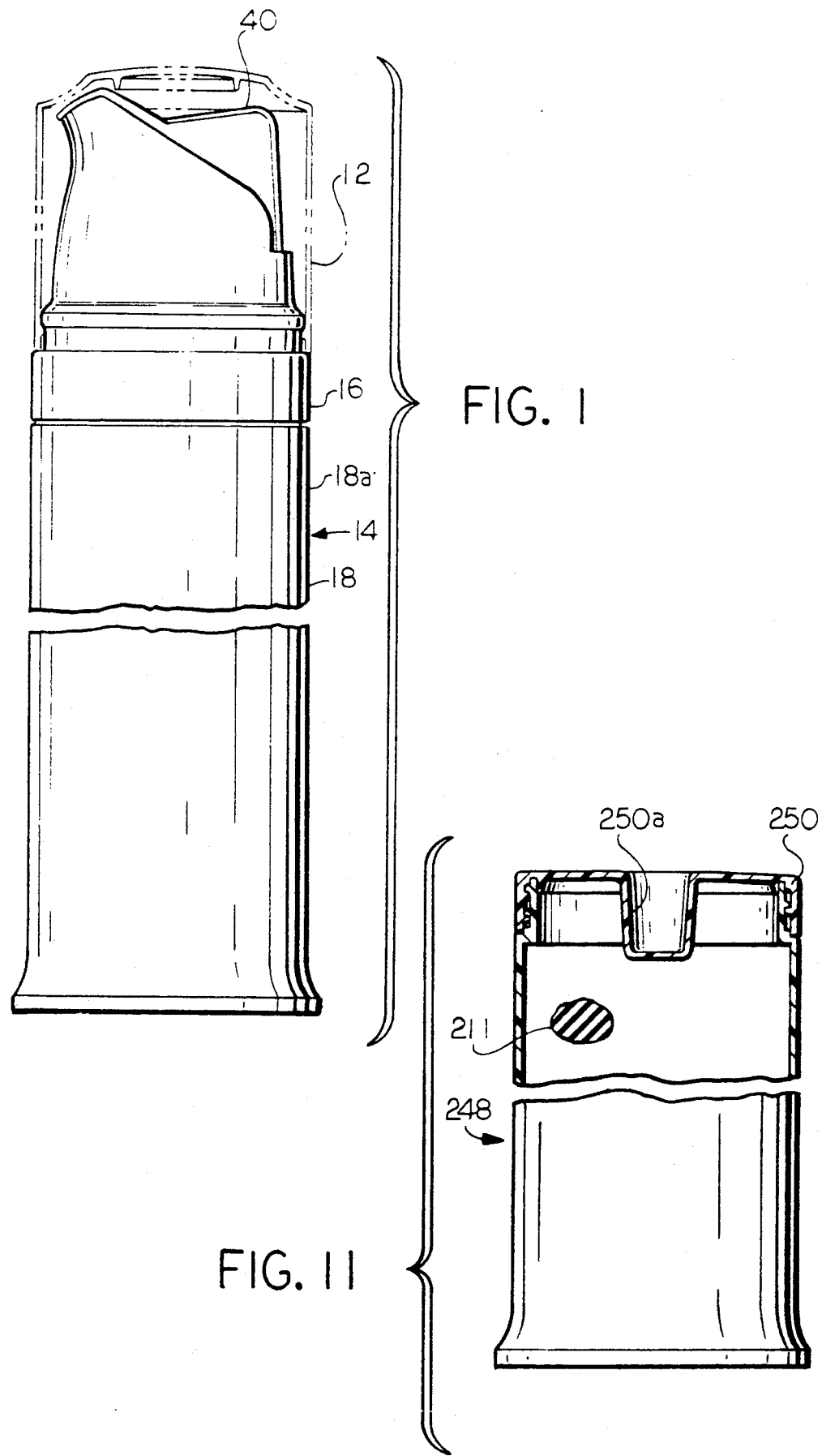
FIG. 1 is an elevational view of a striping version of a viscous product dispensing package according to an embodiment of the present invention, a portion of the package being broken away for the sake of clarity.

As is shown for example in FIGS. 1-5, according to the present invention there is provided a dispensing package which is generally identified by reference numeral 14. The dispensing package 14 is suitable for the packaging and dispensing of a first viscous product P1 from a mass of such product, for example, a gel, a cream, or a paste such as toothpaste. The package is made up of a pumping head portion 16 and a generally cylindrical body portion 18. The package is normally closed when not in use by a removable cover 12, which is shown in phantom only in FIG. 1.

The pumping head portion 16 is made up of an outer member 16a and a transversely extending inner member 16b which are frictionally interlocked, and the pumping head portion 16 is removably attached to an end 18a of the body portion 18, for example, by an internal helical thread 20 on a skirt 16c of the inner member 16b of the head portion 16 which engages an external helical thread 22 on the end 18a of the body portion 18. The end 18a of the body portion 18 is the top end thereof in the normal, upright orientation of the package 14, and the body portion 18 also has a bottom end 18b. The package 14 is normally marketed to retail consumers with the viscous product P1 substantially the bottom end 18b.

The body portion 18 of the package 14 is preferably formed from a generally rigid thermoplastic material, for example, a material whose principal ingredient is polypropylene or high density polyethylene, so long as such material is compatible with any product which is to be packaged therein. When the body portion 18 is formed from such a thermoplastic material, it may be advantageously formed in its illustrated, complex configuration by injection molding. The body portion 18 is formed with its bottom end 18b open, among other reasons to permit the initial filling of the body portion 18 with the product to be packaged therein, a process which is usually performed while the body portion 18 is in an inverted position. Thereupon the bottom end 18b of the body portion 18 is closed by inserting a one-way movable follower piston 24 in the body portion 18 near the bottom end 18b thereof. The follower piston 24 may also be advantageously formed from a suitable thermoplastic material by injection molding, and its one-way travel characteristics result from the attachment of a metallic spring clip 36 to the underside thereof.

The follower piston 24 is free to move upwardly within the body portion 18 in response to the pressure differential which will result as a partial vacuum is developed within the body portion 18 due to the dispensing of product therefrom, as will be hereinafter described more fully. Thus, the movement of the follower piston 24 within the body portion 18 will ensure the presence of product adjacent the top end 18a of the body portion 18, regardless of the gradual dispensing of product from the package 14, at least until substantially all product has been dispensed from the body portion 18. The follower piston 24 has an upper surface 24a which is configured to permit close nesting between the follower piston 24 and adjacent structure of a pumping piston 30, to avoid trapping of product within the package 14 to the maximum possible extent, after the follower piston 24 has completed its upward travel within the body portion 18. The bottom end 18b of the body portion 18 is further closed by a closing member 26 which remains in position as the follower piston 24 rises within the body portion 18. The closing member 26 has an aperture 26a therein to ensure that atmospheric pressure will be maintained on the underside of the follower piston 24.

Figure 2:
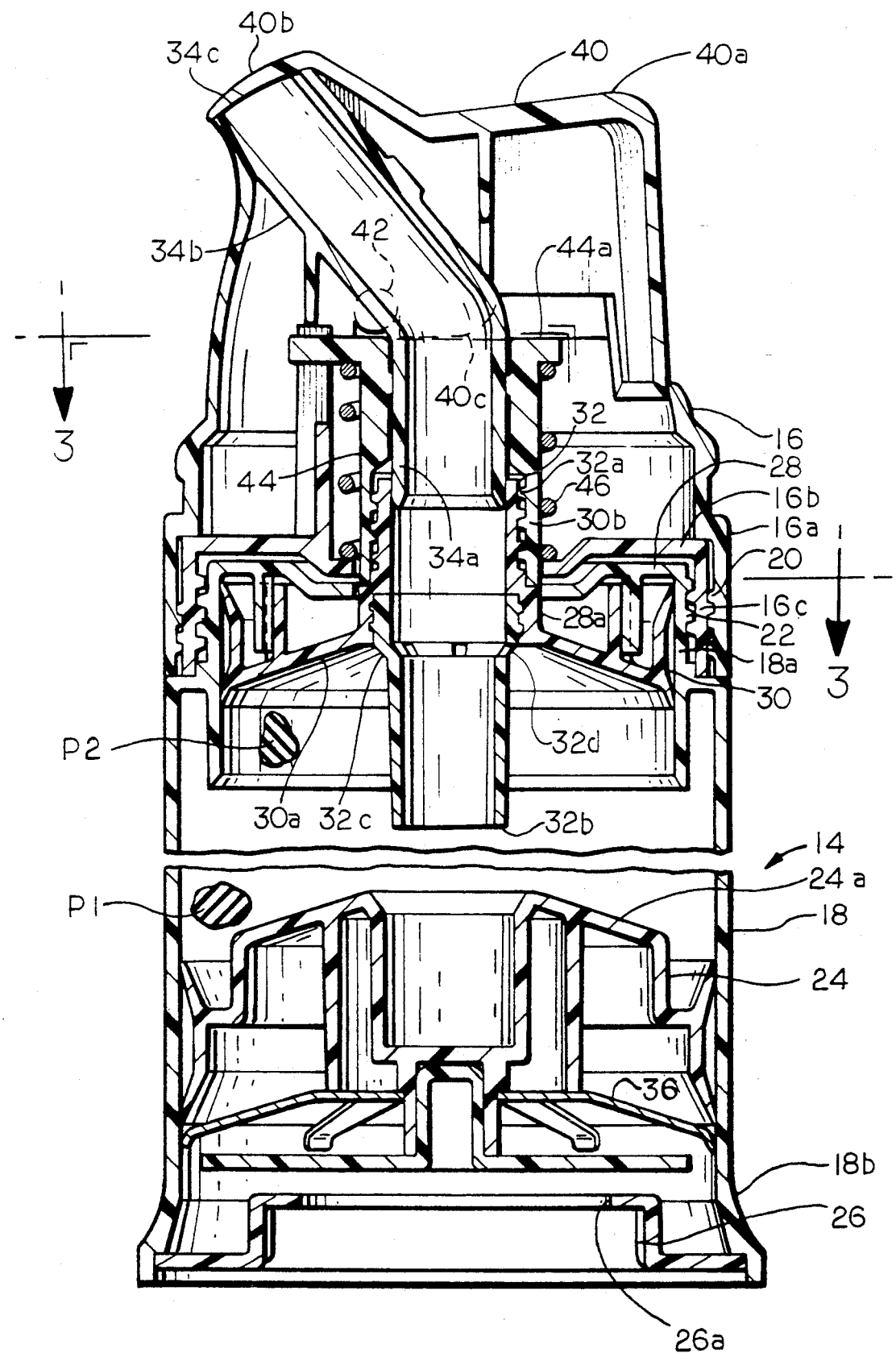
FIG. 2 is a sectional view of the package of FIG. 1 taken on a vertical plane through the longitudinal central axis thereof.
Figure 3:
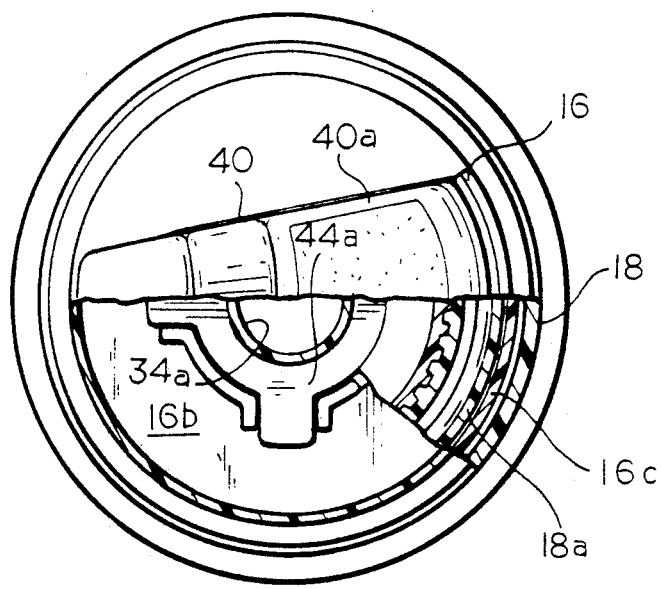
FIG. 3 is a sectional view taken on line 3—3 of FIG. 2.

The top of the dispensing end 18a of the body portion 18 is provided with an annular, transversely extending end structure 28, and is fitted with a separate, reciprocable pumping or dosing piston 30. The dosing piston 30 has a dispensing spout 32 co-axially secured to an elongate annular portion 30b thereof through which product in the body portion 18 can be dispensed. The dispensing spout 32 of the dosing piston 30 extends through an opening 28a in the end structure 28 and is reciprocable within such opening. The dispensing spout 32 of the dosing piston 30 also has a separate outlet portion 32a which is coaxially fitted thereto and which is in telescopic slidable communication with an inlet portion 34a of a dispensing spout 34 of the head portion 16 to permit product to be dispensed from the body portion 18 through the head portion 16 throughout the range of travel of the dosing piston 30. As illustrated in FIG. 2, an outlet portion 34b of the dispensing spout 34 extends obliquely from the inlet portion 34a, which is coaxial with the longitudinal central axis of the body portion 18 and the dispensing spout 32. The orientation of the inlet portion 34a is best suited for the flow of product from within the body portion 18, and the orientation of the outlet portion 34b provides that the product will be dispensed at a location which is quite convenient for a user who is grasping the package 14 for application to an article such as a toothbrush.

A dose or shot of product from the body portion 18 is dispensed by downwardly moving the dosing piston 30, as this will pressurize the product in a way which can only be relieved by the flow or displacement of product outwardly from the body portion 18, given the one-way limitation on the travel of the follower piston 24. The downward movement of the dosing piston 30 is actuated by a pumping lever 40 which is carried by the head portion 16 and which is oscillatable with respect to the head portion 16 about opposed coaxial axles 42 which are frictionally received in recesses 16d of the outer member 16a of the head portion 16. The pumping lever 40 is preferably of a different color than the outer member 16a of the head portion 16 to be readily distinguishable therefrom.

Figure 6:
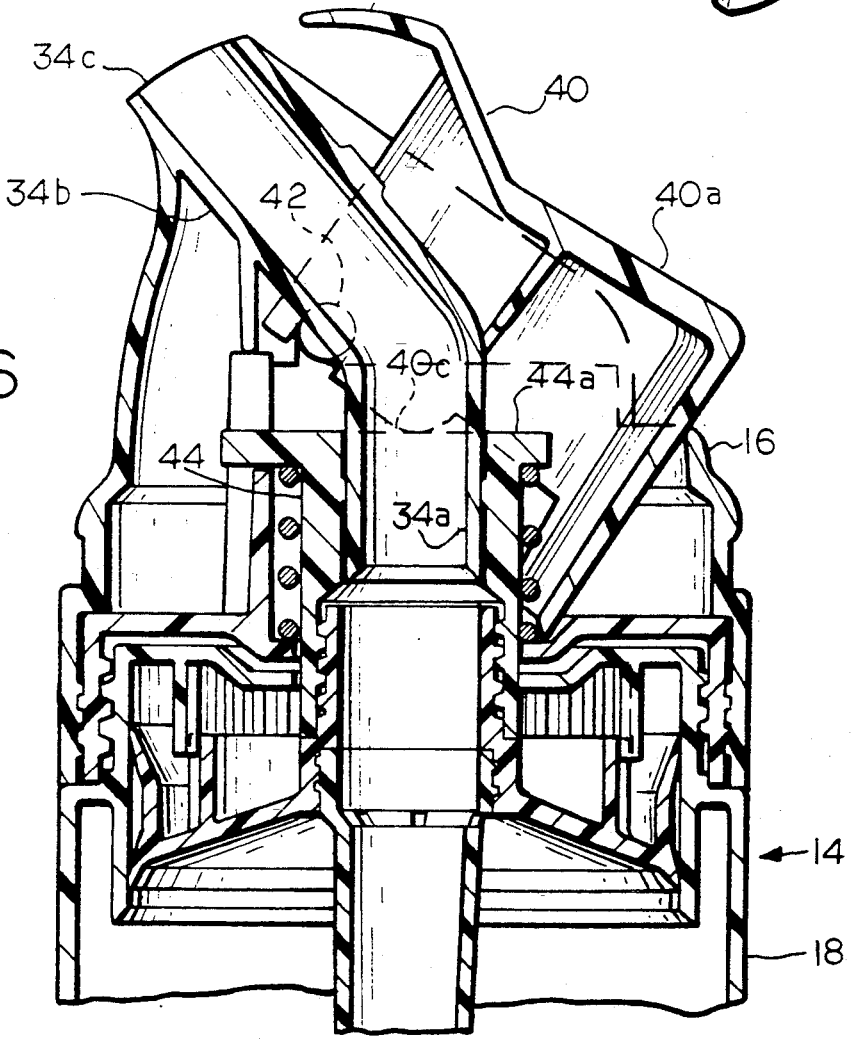
FIG. 6 is a fragmentary vertical sectional view of the package of FIGS. 1-4 in its dispensing condition.
Figure 9:
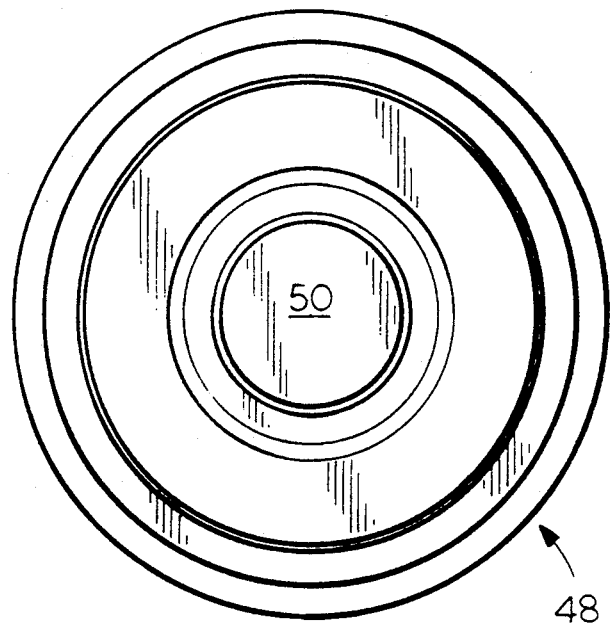
FIG. 9 is a plan view of the replacement cartridge of FIG. 8.

To initiate a dispensing cycle, a finger engaging portion 40a of the pumping lever 40 is moved by finger force through a limited arc in a clockwise direction in the orientation of the package 14 which is illustrated in FIG. 2, an action which will lift a tip portion 40b of the pumping lever 40 clear of a tip 34c of the outlet portion 34d of the dispensing spout 34, as is shown in FIG. 6. The clockwise movement of the pumping lever 40, as described, will also move a cam portion 40c of the pumping lever 40 relative to a collar 44 which is an extension of the annular portion 30b of the dosing piston 30. The movement of the cam portion 40c relative to the collar 44 will move the dosing piston 30 downwardly, an action which will compress a spring 46 that is trapped between the bottom of a flange portion 44a of the collar 44 and the top of the end structure of the inner member 16b of the body portion 16. After the desired amount of product has been dispensed from the body portion 16, finger force is removed from the pumping lever 40. The spring 46 will then return the pumping lever 40 to its original position, with the tip portion 40b closing or substantially closing the tip 34c of the dispensing spout 34, to await the next dispensing cycle.

Striping is accomplished with a package according to the embodiment of FIGS. 1-6 by filling the upper portion of the body portion 18, that is, a portion from a level no lower than the level of the lowermost tip 32b of the dispensing spout 32, with a second viscous product P2, for example, a viscous product of a contrasting color to that of the first viscous product P1. When striping is desired, the dispensing spout 32 is provided with a stepped-up diameter at a level 32c immediately below the bottom of a generally horizontally extending major portion 30a of the dosing piston 30, and a circumferential series of generally radially extending apertures 32d is provided in the dispensing spout 30 at the level 32c. Downward movement of the dosing piston 30 and the dispensing spout 32, which travel in unison, will, thus, result in the dispensing of a composite bead of product which is made of a core of the product P1 having strips or stripes of the product P2 applied to the surface thereof, the product P1 entering the dispensing spout 32 through the bottom tip 32b thereof, and the stripes of the product P2 entering the dispensing spout 32 through the apertures 32d.

Figure 8:
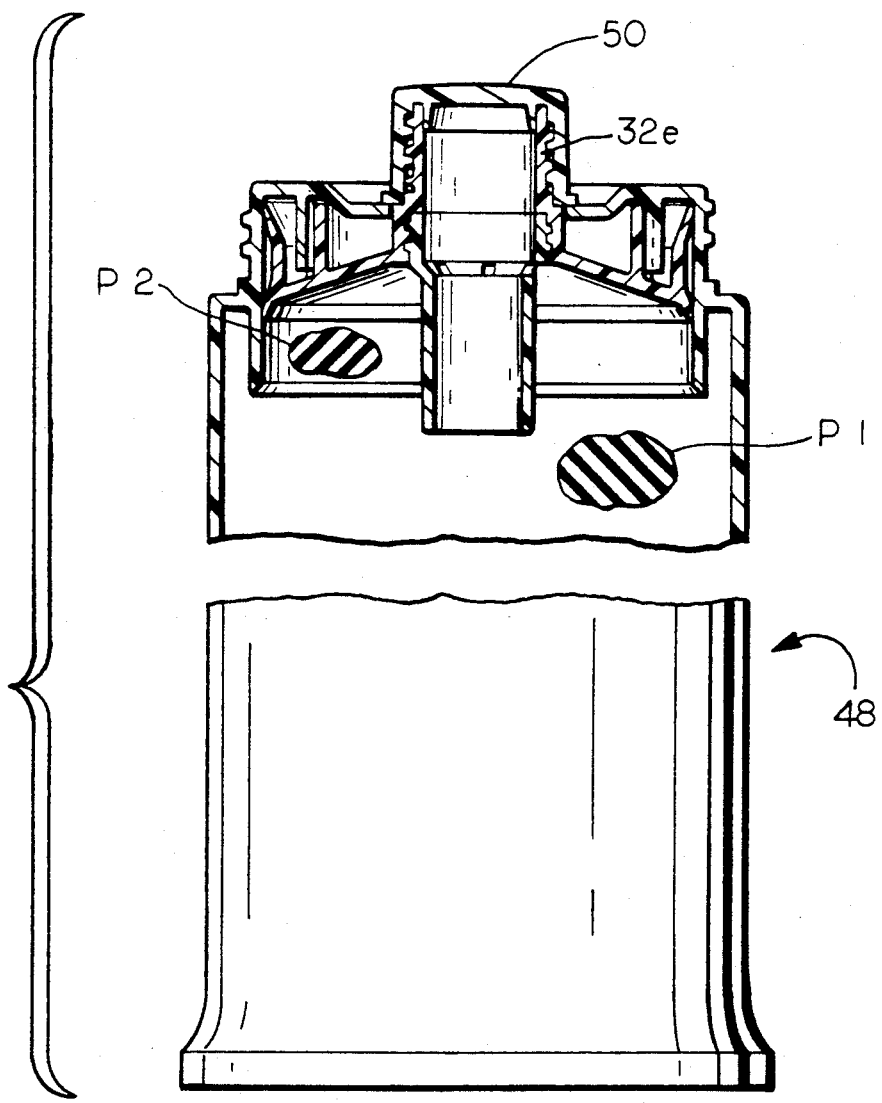
FIG. 8 is a vertical elevational view, partly in section, of a replacement cartridge for the package of FIGS. 1-6.

After all or substantially all product has been dispensed from the body portion 18 in a multiplicity of doses or shots, each of a relatively small mass, the body portion 18 and the head portion 16 may be disengaged from one another and the head portion 16 can then be reapplied to a fresh body portion 18. FIG. 8 illustrates a replacement cartridge 48 which includes a fresh body portion 18 with a closing member 50 removably applied to an outlet tip portion 32e of the dispensing spout 32. Before a head portion 16 that is to be reused is applied to a replacement cartridge 48, the closing member 50 is removed from the replacement cartridge 48 and discarded. As can be seen from FIG. 8, the diameter of the closing member 50 is rather small in relation to the outside diameter of the cartridge 48. This will minimize the surface area of the product P1 in the cartridge 48 which is exposed to viewing when the closing member 50 is removed.

Figure 7:
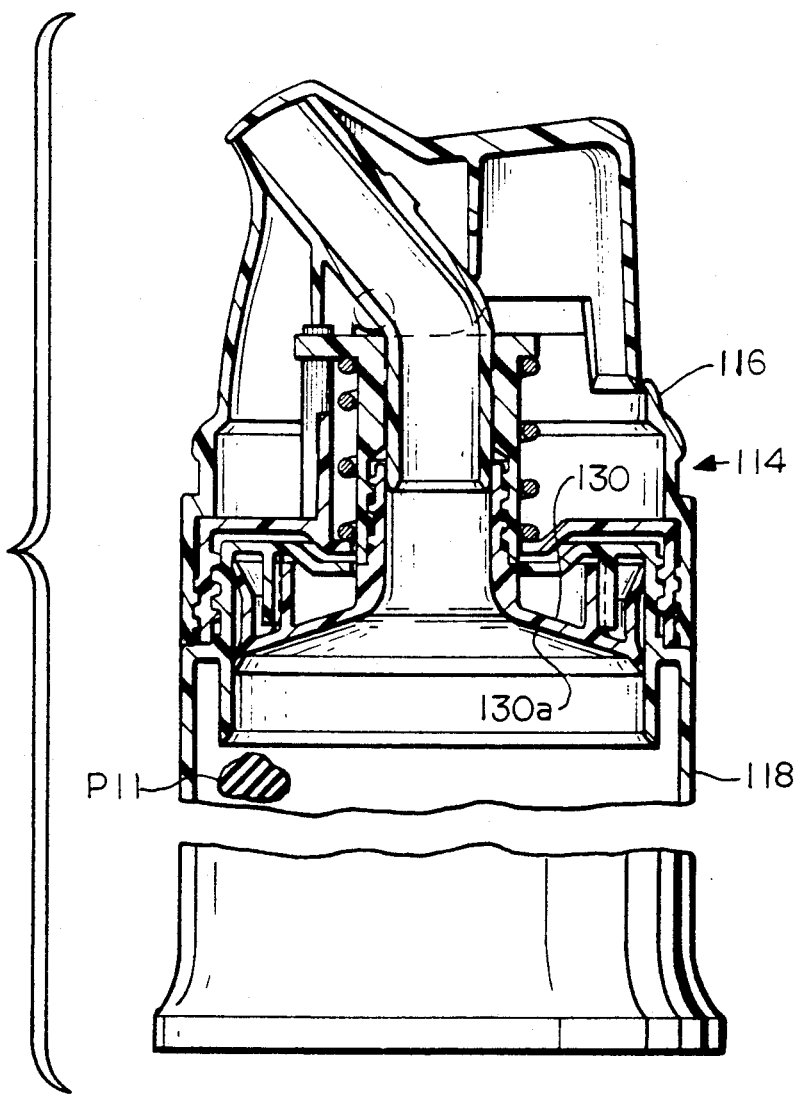
FIG. 7 is a view similar to FIG. 2 of a nonstriping version of the embodiment of FIGS. 1-6.
Figure 4:
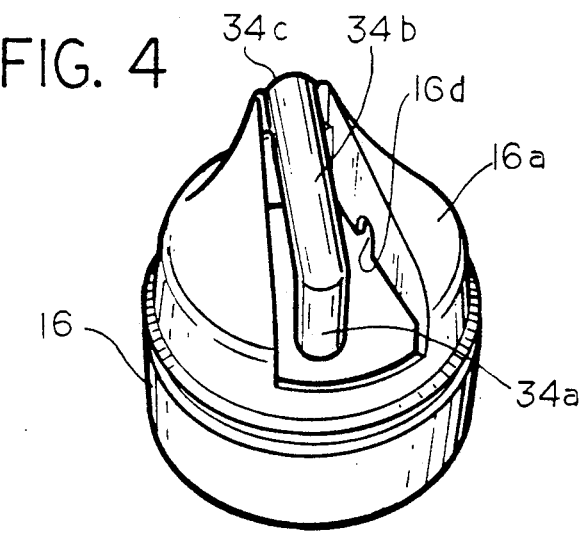
FIG. 4 is a perspective view of a component of the package of FIGS. 1-3.
Figure 5:
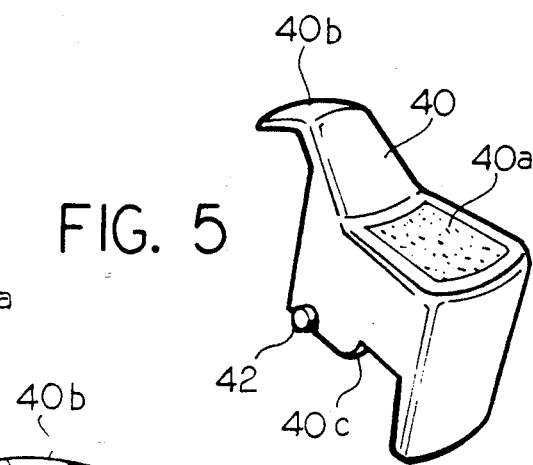
FIG. 5 is a perspective view of another component of the package of FIGS. 1-3.

FIG. 7 illustrates a dispensing package 114 which generally corresponds to the dispensing package 14 of the embodiment of FIGS. 1-6 in that it is made up of a body portion 118 and a head portion 116 which is removably attached to the body portion 118 and which can be reused with a like body portion 118 after the product to be dispensed, P11, has been substantially dispensed from the original body portion 118. The dispensing package 114 is used to dispense an unstriped product consisting entirely of the product P11; hence, it does not contain a second, striping product corresponding to the product P2 of the embodiment of FIGS. 1-6, and it does not contain spout structure extending below the horizontally extending portion 130a of its pumping piston 130. Otherwise, the embodiment of FIG. 7 corresponds in structure and function to the embodiment of FIGS. 1-6.

Figure 10:
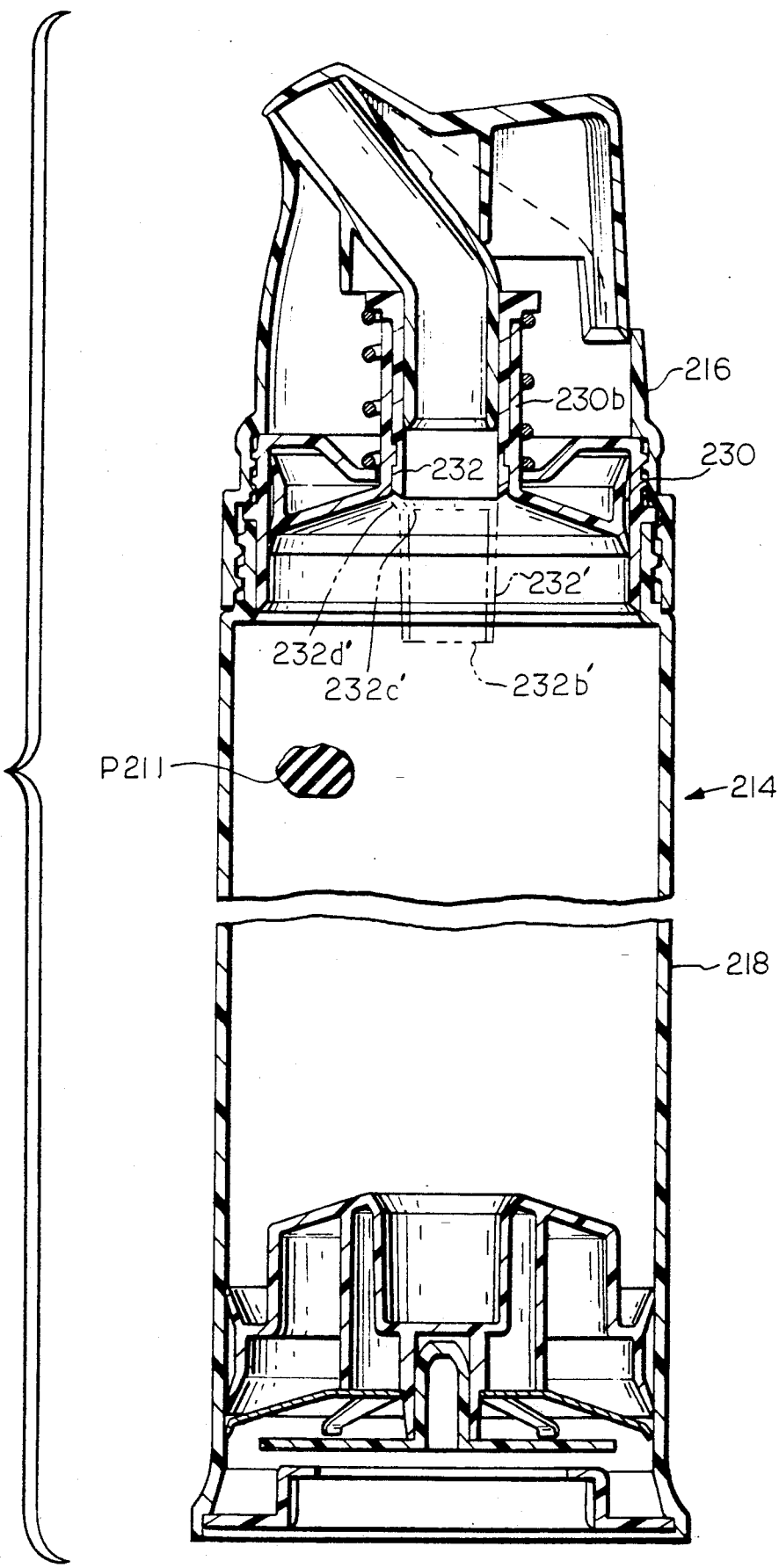
FIG. 10 is a view similar to FIG. 7 of an alternative embodiment of a dispensing package according to the present invention.

FIG. 10 illustrates an alternative embodiment of the present invention in which a dosing piston 230 is a part of a reusable head portion 216 of a dispensing package 214, rather than a part of a disposable body portion 218 thereof as in the case of the dosing piston 30 of the dispensing package of FIGS. 1-6. The embodiment of FIG. 10 is advantageous relative to the embodiment of FIGS. 1-6 in that the embodiment of FIG. 10 incorporates a greater number of reusable components.

The embodiment of FIG. 10 can be provided either in a non-striping version, as is illustrated in solid line in FIG. 10, or it can be provided in a striping version by providing a dispensing spout 232 which is co-axially secured to the dosing piston 230 with a downwardly extending portion 232', shown in phantom. The dispensing spout 232 incorporates apertures 232d' at the juncture of the downwardly extending portion 232' and a stepped up diameter 232c' of the dispensing spout 232. As illustrated, the dispensing spout 232 contains structural features, and performs functions, of both the dispensing spout 32 and the collar 44 of the embodiment of FIGS. 1-6. Where the embodiment of FIG. 10 is desired to be used in a non-striping version, the downwardly extending portion 232' may be severed from the parent dispensing spout 232 prior to the assembly of the head portion 216. To accommodate the downwardly extending portion 232' of the dispensing spout 232, a closing member 250 of a replacement cartridge 248 for the disposable body portion 218 of the dispensing package 218 is provided with a centrally located recess 250a, FIG. 11, which will ensure that there will be a void within the product P211 to receive a bottom tip 232b' of the dispensing spout 232, and a closing member 250 with the recess 250a can be used even with a non-striping version of the dispensing package 214.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A dispensing package for containing and dispensing a viscous product, said package comprising:
   a head portion; and
   a generally cylindrical body portion;
   said head portion being removably secured to a first end of said body portion;
   said body portion having a unidirectionally movable follower piston initially positioned near a second end of said body portion and a mass of a viscous product between said first end and said follower piston, said follower piston being movable toward said first end by atmospheric pressure as product is dispensed from the mass;
   a reciprocable dosing piston positioned adjacent said first end of said body portion, said dosing piston having a flow passage extending therethrough, said dosing piston being movable in a first direction toward said second end of said body portion, movement of said dosing piston in said first direction pressurizing the mass of viscous product and causing a dose of viscous product from the mass to be dispensed from the package through said flow passage;
   said head portion having manually oscillatable pumping mechanism, said pumping mechanism operatively engaging said dosing piston and being movable in an arc in a first arcuate direction to move said dosing piston in said first direction from a first position to a second position upon the application of force to said pumping mechanism;
   said head portion further having biasing means, said biasing means urging said pumping mechanism in an arc in a second arcuate direction, said second arcuate direction being opposed to said first arcuate direction, said biasing means moving said dosing piston from said second position to said first position upon the release of the external force from said pumping mechanism.

2. A dispensing package according to claim 1 wherein said body portion comprises an end member positioned at said first end of said body portion, said end member having an aperture therein; and
   wherein said dosing piston comprises a piston element positioned within said body portion, and dosing piston spout means carried by said piston element and being reciprocable with said piston element, said dosing piston spout means defining said flow passage in said dosing piston and extending through said aperture and being reciprocable with respect to said aperture.

3. A dispensing package according to claim 2 wherein said dosing piston spout means has radially projecting flange means, said radially projecting flange means being external to said end member, and wherein said biasing means comprises coil spring means, said coil spring means being trapped between said flange means and said end member.

4. A dispensing package according to claim 3 wherein said head portion comprises an outer member and an inner member, said head portion frictionally engaging said inner member, said inner member having a transversely extending annular portion, said coil spring means being trapped between said flange means and said transversely extending annular portion of said inner member and said flange means.

5. A dispensing package according to claim 1 wherein said head portion comprises a depending annular skirt with an internal helical thread thereon, and wherein said first end of said body portion has an external helical thread thereon, said internal helical thread of said skirt of said head portion engaging said external helical thread of said first end of said body portion to prevent the normal removal of said head portion from said body portion other than by relative rotation between said head portion and said body portion.

6. A dispensing package according to claim 2 wherein said dosing piston spout means extends downwardly into said body portion for a substantial distance and terminates in an open tip, and wherein said dosing piston spout means has at least one aperture extending through said dosing piston spout means at a level above said open tip, said at least one aperture permitting at least one strip of a second viscous product from within said body portion at a level above said open tip to be applied through said at least one aperture to a bead of the viscous product as said bead of the viscous product is dispensed through the dosing piston spout means.

7. A dispensing package according to claim 6 wherein said at least one aperture comprises a plurality of circumferentially spaced apart apertures.

8. A dispensing package according to claim 2 wherein said head portion comprises head portion dispensing spout means, said dosing piston spout means having an outlet portion, said head portion spout means having an inlet portion which is coaxial with said outlet portion of said dosing piston spout means, one of said inlet portion of said head portion spout means and said outlet portion of said dispensing portion spout means being telescopically received in the other of said head portion spout means and said outlet portion of said dosing piston spout means both in said first position of said dosing piston and said second position of said dosing piston.

9. A dispensing package according to claim 8 wherein said outlet portion of said dosing piston spout means is telescopically received in said inlet portion of said head portion dispensing spout means.

10. A dispensing package according to claim 1 wherein said body portion is substantially open at the top thereof; and wherein said dosing piston comprises a piston element that is initially positioned within said head portion, said piston element being reusable with said head portion when said head portion has been removed from said body portion and removably applied to another body portion.

11. A dispensing package according to claim 10 wherein said dosing piston comprises dosing spout means carried by said piston element and reciprocable therewith, wherein said dosing piston spout means extends downwardly for a substantial distance into said body portion when said head portion is secured to said body portion, said dosing piston spout means terminating in an open tip, and wherein said dosing piston spout means has at least one aperture extending through said dosing piston spout means at a level above said open tip, said at least one aperture permitting at least one strip of a second viscous product from within said body portion at a level above said open tip to be applied through said at least one aperture to a bead of the viscous product as said bead of the viscous product is dispensed through the dosing piston spout means.

12. A dispensing package according to claim 11 wherein said at least one aperture comprises a plurality of circumferentially spaced apart apertures.

13. A method for dispensing doses of a viscous product from a replaceable mass of a viscous product, said method comprising the steps:

providing a dispensing package containing a mass of the viscous product, the dispensing package comprising:
a head portion, and
a body portion, the head portion being removably secured to a first end of the body portion,
the body portion having a unidirectionally movable follower piston initially positioned near a second end of the body portion and a mass of a viscous product between the first end and the follower piston, the follower piston being movable toward the first end by atmospheric pressure as product is dispensed from the mass,
a reciprocable dosing piston positioned adjacent the first end of the body portion, the dosing piston having a flow passage extending therethrough, the dosing piston being movable in a first direction toward the second end of the body portion, movement of the dosing piston in the first direction compressing the mass of Viscous product and causing a dose of viscous product from the mass to be dispensed from the package through the flow passage,
the head portion having a manually oscillatable pumping mechanism operatively engaging the dosing piston and being movable in a first arcuate direction to move the dosing piston from a first position in the first direction to a second position upon the application of an external force to the pumping mechanism,
the head portion further having biasing means, the biasing means urging said pumping mechanism in an arc in a second arcuate direction, the second arcuate direction being opposed to the first arcuate direction, the biasing means moving the dosing piston from the second position to the first position upon the release of the external force from the pumping mechanism;
repeatedly and alternatively applying external force to, and releasing external force from, the pumping mechanism to dispense at least a substantial portion of the mass of viscous product in the body portion in a plurality of doses;
removing the head portion from the body portion; and
securing the head portion to a second body portion, the second body portion being like the first body portion and containing a fresh mass of viscous product.

14. The method of claim 13 and further comprising, after the head portion has been secured to the second body portion;

repeatedly and alternatively applying external force to, and releasing external force from, the pumping mechanism to dispense at least a substantial portion of the fresh mass of viscous product in the second body portion in a second plurality of doses.

15. The method according to claim 14 wherein the dosing piston is a component of the head portion, wherein the dosing piston is removed from the body portion with the head portion, and wherein the dosing piston is secured to a second body portion with the head portion.

16. The method according to claim 14 wherein the dosing piston is a component of the body portion, and wherein the second body portion comprises a second dosing piston.

* * * * *